(12) United States Patent
Gerum

(10) Patent No.: US 6,541,932 B2
(45) Date of Patent: Apr. 1, 2003

(54) ROBOT AREA MONITORING DEVICE

(75) Inventor: Georg Gerum, Bobingen (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/861,366

(22) Filed: May 18, 2001

(65) Prior Publication Data
US 2002/0005702 A1 Jan. 17, 2002

(30) Foreign Application Priority Data

May 19, 2000 (DE) ..................... 200 09 039 U

(51) Int. Cl.⁷ .................................. B25J 5/00
(52) U.S. Cl. ............. 318/568.12; 318/568.15; 318/568.21; 318/567; 318/566; 318/626; 901/2; 901/12; 901/41
(58) Field of Search ............ 318/568.16, 568.15, 318/568.21, 567, 566, 626; 901/2, 12, 41

(56) References Cited

U.S. PATENT DOCUMENTS 3,798,979 A * 3/1974 Kienhofer .................. 74/22 R
4,879,499 A * 11/1989 Iwata ..................... 318/568.16
6,276,051 B1 * 8/2001 Asai et al. ............. 318/568.16

FOREIGN PATENT DOCUMENTS

| DE | 2 146 720 | 3/1973 |
| DE | 33 10 135 | 10/1984 |
| DE | 38 29 755 | 3/1989 |

OTHER PUBLICATIONS

Michihiko, 1992, Industrial Robot, Patent Abstracts of Japan vol. 016/No. 359.

* cited by examiner

Primary Examiner—Karen Masih
(74) Attorney, Agent, or Firm—McGlew and Tuttle, P.C.

(57) ABSTRACT

In a robot area monitoring device, in which at least one area of a rotary movement about at least one robot axis is monitored, initiators cooperating with part annular cams arranged coaxially to the axis to be monitored are provided, the initiators being connected to an evaluating device.

20 Claims, 8 Drawing Sheets

ROBOT AREA MONITORING DEVICE

FIELD OF THE INVENTION

The invention relates to a device for monitoring the area, region or range of a robot, monitoring taking place of at least one area of a rotary movement about at least one robot axis.

BACKGROUND OF THE INVENTION

Hitherto for the area monitoring of robot axes use has been made of conventional methods with components which involve contact, such as in particular mechanical cam switches. Such cam switches and associated evaluations are complicated and costly. In addition, such components are subject to high wear, so that there is a high monitoring and replacement need. In addition, they are also subject to malfunctions. In the case of such a monitoring with mechanical switches and relays with forcibly guided contacts it is not possible achieve a desirable electronic programmability and variability of the areas to be monitored.

Therefore the problem of the invention is to provide an area monitoring in which the aforementioned disadvantages are overcome.

SUMMARY OF THE INVENTION

In the case of device in the aforementioned type, the problem is inventively solved in that initiators or switches cooperating with part annular cams positoned coaxially to the axis being monitored are provided and the initiators are connected to an evaluating device.

Thus, for solving the problem the invention provides for the use of electronic initiators, such as in particular electronic proximity switches, which are connected to an evaluating device. In an extremely preferred development with each area to be monitored, consisting of a release or working area and a danger area, there are at least two independently operating initiators so that high security and safety are obtained. The two initiators can be permanently monitored with respect to their functional efficiency by the evaluating device. The invention provides for an area monitoring for robot axes with a secure and safe technology by means of which the axis-related movement areas for the individual robots can be blocked in order to protect persons and material. However, the device according to the invention suffers the high demands made on the safety of monitoring circles for personnel protection.

In a preferred further development, grooved strips arranged coaxially to the axis about which a movement is monitored are connected to cams and that with each cam is associated an initiator.

According to a further development with an area to be monitored is associated an initiator operating as an opener and an initiator operating as a closer. In a preferred development a danger area of a monitoring area is protected by an initiator operating as an opener and/or a release area of a monitoring area is protected by an initiator operating as a closer. A preferred combination of the aforementioned construction is characterized in that an initiator operating as an opener is associated with a cam corresponding to a danger area and an initiator operating as a closer is associated with a cam corresponding to a release area for the same area to be monitored.

According to further developments of the invention the cams are retained by two-part cam end pieces, whose lower part is positively retained in the grooved strip in radial movement and whose upper part is connected to the lower part and the lower and upper parts can be braced against one another for non-positive fixing on the grooved strip and also braced against the latter.

In another development according to the invention a cam is fixed between two cam end pieces and it can also be provided that a cam is connected to the cam end pieces by threaded pins.

Another preferred construction of the invention is characterised in that the initiators are adjustable and fixable relative to the cams associated therewith both radially and in elevation parallel to the axis with respect to which the cams are coaxially arranged. In a further development there is an at least two-channel monitoring for each area to be monitored.

Finally, according to the invention, there can be a combination of an area monitoring of the movement of the robot and an access monitoring with respect to the robot.

BRIEF DESCRIPTION OF THE DRAWINGS

Further advantages and features of the invention can be gathered from the claims and the following description of an embodiment of the invention with reference to the attached drawings, wherein show:

FIG. 5 The fixing of a cam on a grooved strip.

DETAILED DESCRIPTION OF THE DRAWINGS

Figure 1:
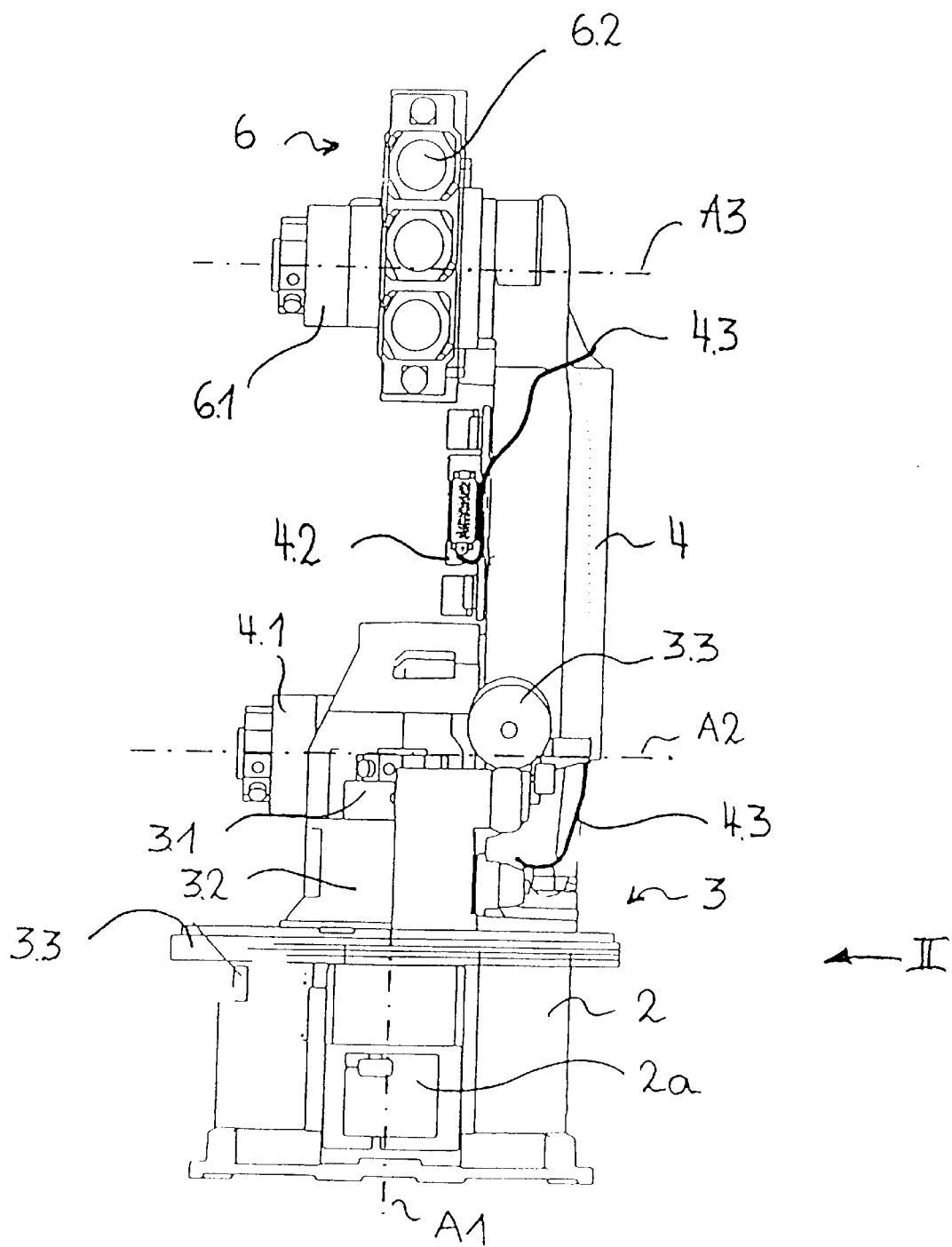
FIG. 1 A rear view of a robot in which the invention is provided.

The invention relates to a conventional robot 1, such as an industrial robot. The latter has a base 2 connected firmly to the floor, a carousel 3 rotatable relative to the base 2 about the vertical A1 axis, a rocker arm or link 4 articulated to said carousel and pivotable relative thereto about the horizontal A2 axis and a robot arm or link 6 pivotable relative to the rocker arm about the A3 axis. As further elements of the robot 1, FIG. 1 shows a first motor 3.1 for driving the carousel 3 about the A1 axis located in a support structure 3.2 for the rocker arm 4, a weight compensation 3.3 for the rocker arm 4 articulated between the latter and the carousel 3, a second motor 4.1 for moving the rocker arm 4 about the A2 axis and a third motor 6.1 for moving the arm 6 about the A3 axis.

On the back of the arm 6 there are three superimposed motors, whereof only the upper motor 6.2 is shown, serving to drive the hinged robot hand not shown in FIG. 1 with its three axes A4 to A6.

A holder for proximity switches for the movement about the initiators monitoring the A2 and A3 axes is 4.2, whilst 4.3 is the control line for these initiators.

Figure 2:
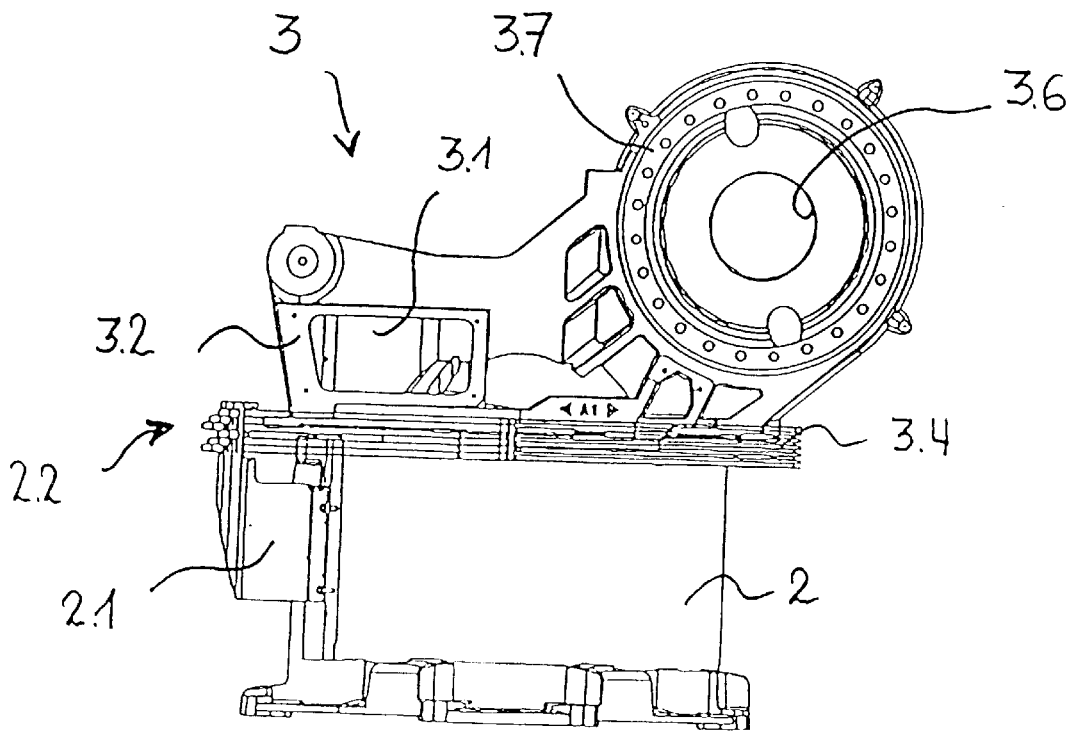
FIG. 2 A side view of the lower area (base, carousel, rocker arm articulation) of a robot.

FIG. 2 shows in the lower area a robot of this type in a side view corresponding to arrow II of FIG. 1 and in greater detail.

Figure 7:
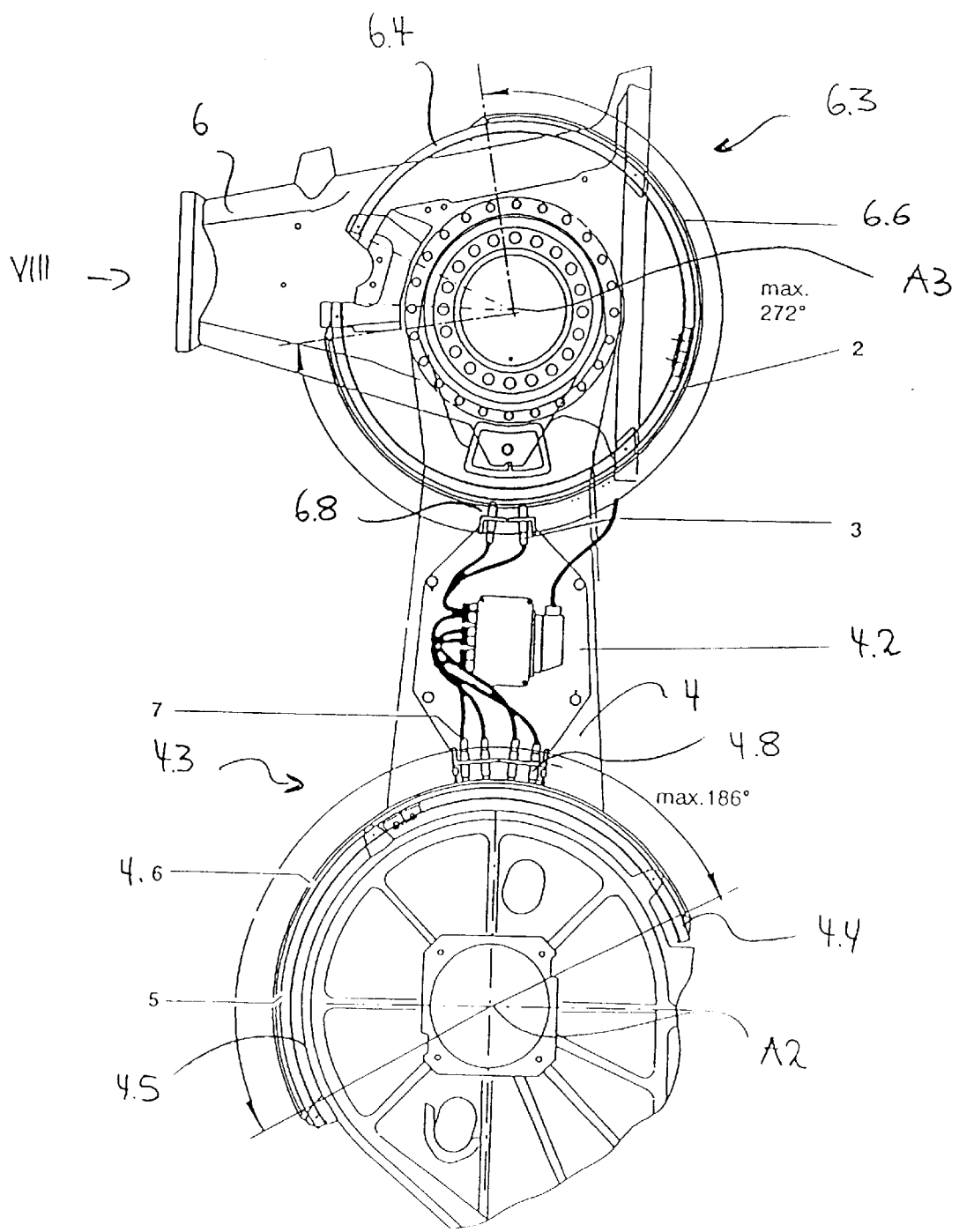
FIG. 7 A side view of a rocker arm with grooved strips and cams, as well as associated initiators.

To the circumference of the carousel plate 3.3 (FIG. 1) are fixed grooved strips 3.4. In the embodiment shown they are in the form of two semicircular grooved strips, which together completely surround the carousel plate 3.3. To the grooved strips 3.4 are fixed cams (further description hereinafter), which are pivotable together with the carousel 3 relative to the base 2. On the base 2 are provided a holder 2.1 for the cams of the initiators 2.2 associated with the grooved strip 3.4. The support structure 3.2 for the rocker arm 4 carries a bearing 3.6 for the same. Around a bearing ring 3.7 surrounding the bearing 3.3 are fitted grooved strips for cams for monitoring the movement of the rocker arm 4, which are not shown in FIG. 2 and are explained in greater detail hereinafter with reference to FIG. 7 ff.

Figure 3:
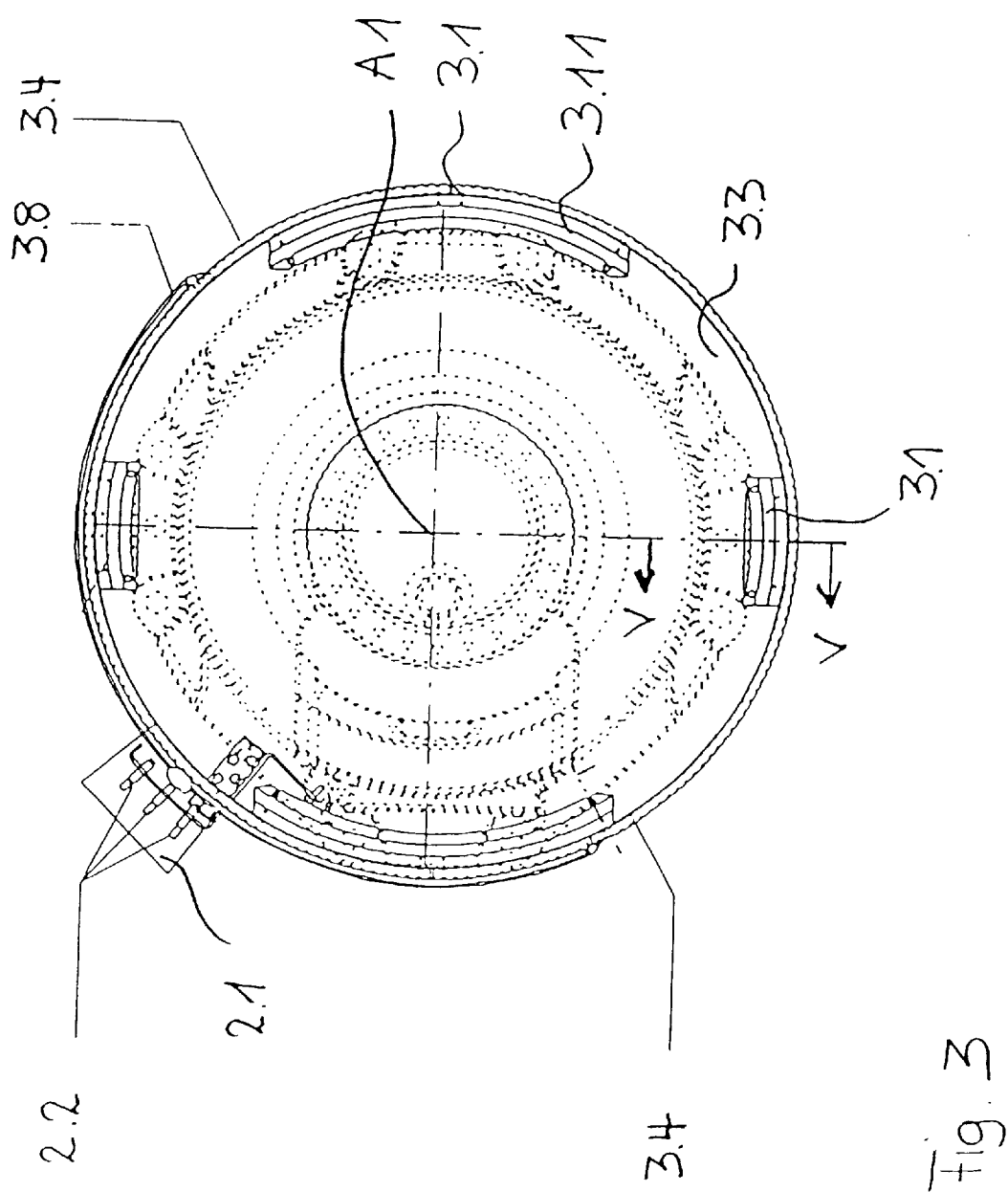
FIG. 3 A vertical view of the carousel plate of a robot and the device for monitoring the A1 axis.

FIG. 3 shows a carousel plate and constructional elements of the carousel 3 are shown in broken line form thereon. Around the carousel plate 3.3 are located the grooved strips 3.4, to which are fixed cams 3.8 in a monitoring area and with the same are associated the initiators 2.2 held by the holder 2.1.

Figure 4:
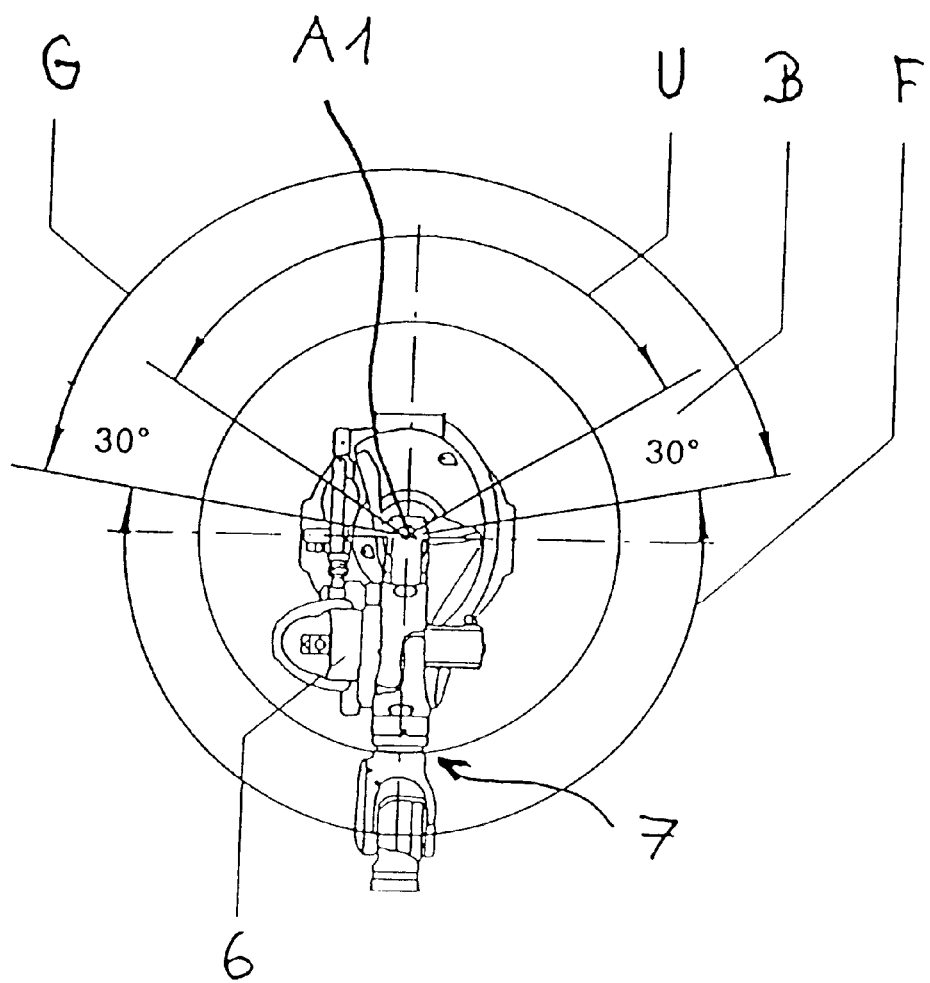
FIG. 4 A representation for interpreting the monitoring areas about an axis.

FIG. 4 diagrammatically shows the area for monitoring the movement of a robot or more precisely its carousel 3 about the A1 axis. The length of a cam 3.8 and consequently the angle covered by it is a function of the size of the monitoring area U. The resulting monitored danger area G comprises the angle of the monitoring area U and a further angular range B for the braking path of the robot of approximately 30° in the case of a maximum speed. The robot braking path is a function of its mass moment of inertia. The thus defined danger area G is protected by a proximity initiator acting as an opener.

The release or clearance area F within which the robot can function incorporates an angle between 360° and the angle determined in the danger area G. It is protected by a cam corresponding to its angle. The total cam length is always 360°. The release area F is monitored by a proximity initiator acting as a closer.

Thus, for as long as it "sees" the cam in such a way that the switches, relays, etc. for the power supply of the corresponding drive, here of the motor 3.1 for movement about the A axis, the initiator allows a power supply for the release area F, whilst in the case of a robot movement out of this area it permits a stopping of the corresponding drive, optionally in as far as further conditions are fulfilled, such as e.g. the opening of access to the area in which the robot is operating, such as its work compartment. The initiator acting as an opener and monitoring the danger area G permits driving for as long as it does not see the cam associated with it. If the cam associated with it moves into its area, it places the switches, relays, etc. in a position leading to or permitting a stopping of the corresponding robot drive, provided that the further conditions mentioned are fulfilled. The proximity initiator for the danger area G and the proximity initiator for the release area F are switched in such a way that if the robot moves out of the release area F into the danger area G and this is detected by one of the two switches, a stopping of the robot drive is permitted or optionally brought about if further conditions exist. The function of the initiators can be permanently monitored in per se known manner.

Figures 5A, 5B:
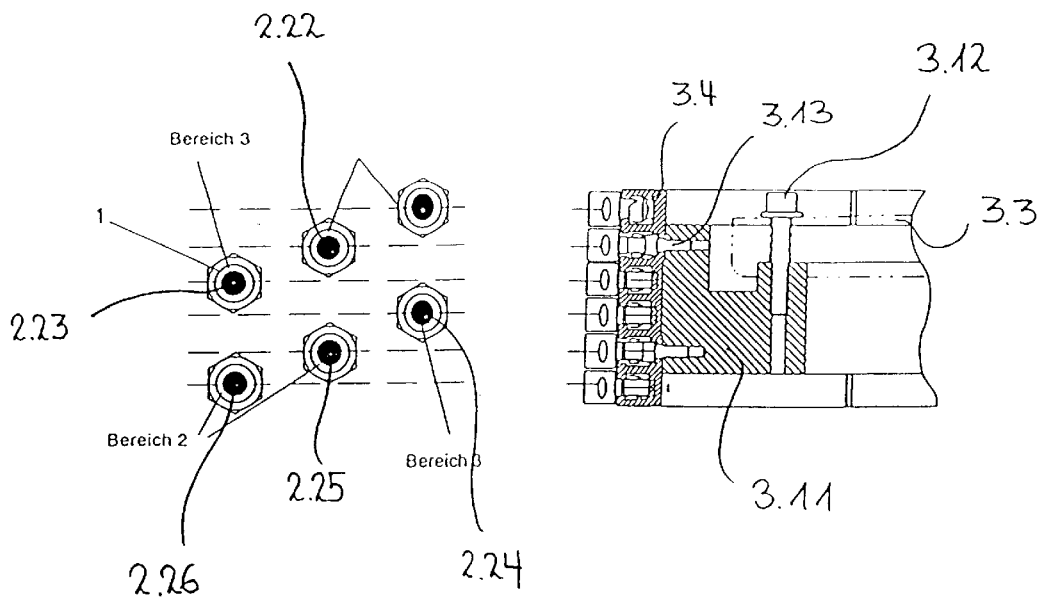
FIGS. 5a–c The fixing of cams on a grooved strip and the association of initiators with the cams.

FIG. 5a shows the fixing of the grooved strips 3.4 to the carousel plate 3.3 or an outer circumferential area thereof, shown in broken line form in FIG. 5a. Firstly to the carousel plate 3.3 are fixed part annular segments 3.11 by means of screws 3.12, such as hexagonal socket-head screws. The grooved strips 3.4 are also fixed to these segments 3.11 by screws 3.13, such as hexagonal socket-head screws. In the area to be monitored, the cams 3.8 (FIGS. 5c, 6) are fixed by end pieces 3.14 to the grooved strips 3.4. Each cam end piece comprises a lower part 3.15 and an upper part 3.16, which are interconnected by means of a screw 3.17. The lower part is positively held in a groove of the grooved strip. For as long as the screw 3.17 is not firmly tightened, the cam end pieces 3.16 can slide along the grooved strip 3.4. By tightening the screw 3.17 there is a reliable non-positive fixing. Between the cam end pieces 3.14, as is shown in detail in FIG. 6, is held a cam 3.8, which is connected to a cam end piece by a threaded pin 3.19.

An initiator 2.21 to 2.26 is generally associated with each cam 3.8. As for an area to be monitored (comprising the danger and release area) two cams are provided, whose total circumference covers 360° and with each of these cams is associated an initiator, e.g. 2.21 and 2.22 (FIG. 6), such a first area is monitored by the two said initiators. The same applies in FIG. 7 for initiators 2.23, 2.24 for monitoring another area, in which the cams are arranged differently relative to the first area and optionally have different lengths and finally for the initiators 2.25 and 2.26 for monitoring a third area. In the construction shown in FIG. 5b it is possible to monitor three different areas with in each case different danger and release areas.

Figures 5C, 6:
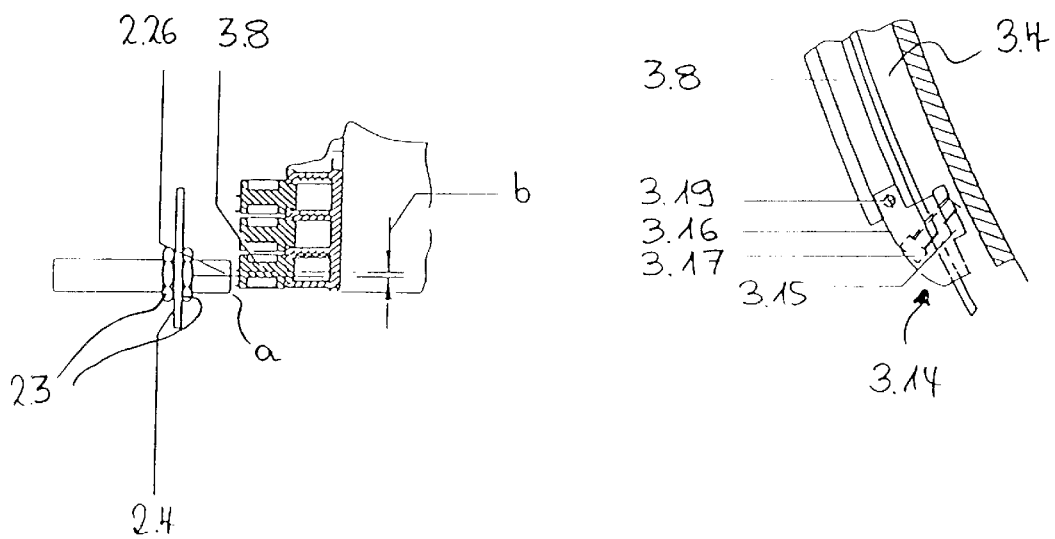
FIG. 6 A view of an end cam.

It is important that the initiators, e.g. in FIG. 5c initiator 2.26, is located level with the associated cam 3.8 and has a predetermined spacing with respect to its outer end face, because on the one hand the initiators must not contact the cams and on the other a maximum spacing must not be exceeded. The setting of the radial spacing of the initiators relative to the free outside of the radial spacing and therefore the radial clearance on the initiators relative to the free outside of the cam can take place by means of a setting gauge with a predetermined thickness. The gauge is inserted between cams and initiators. The initiator is then moved against the cam until it is just possible to extract the setting gauge. The initiator (2.26 in FIG. 5c) is fixed in its radial position by adjusting and tightening lock screws 2.3. As a function of the manufacturer, the gap a can be between 2 and 3 mm.

It is also important that the height setting of the initiators coincides with the associated cams, i.e. the centre axis of an initiator, such as initiator 2.26 must have relative to the median p lane of the cam, such as cam 3.8 in FIG. 5c, a larger than preset displacement or offset b over the entire angular and length range covered by the corresponding cam 3.8. The height displacement b must generally be no more than 0.5 mm. The height of the initiators is set by means of a holder 2.4, which is displaceable along its orientation or alignment and therefore relative to the median plane of the cam.

Figures 8A, 8B:
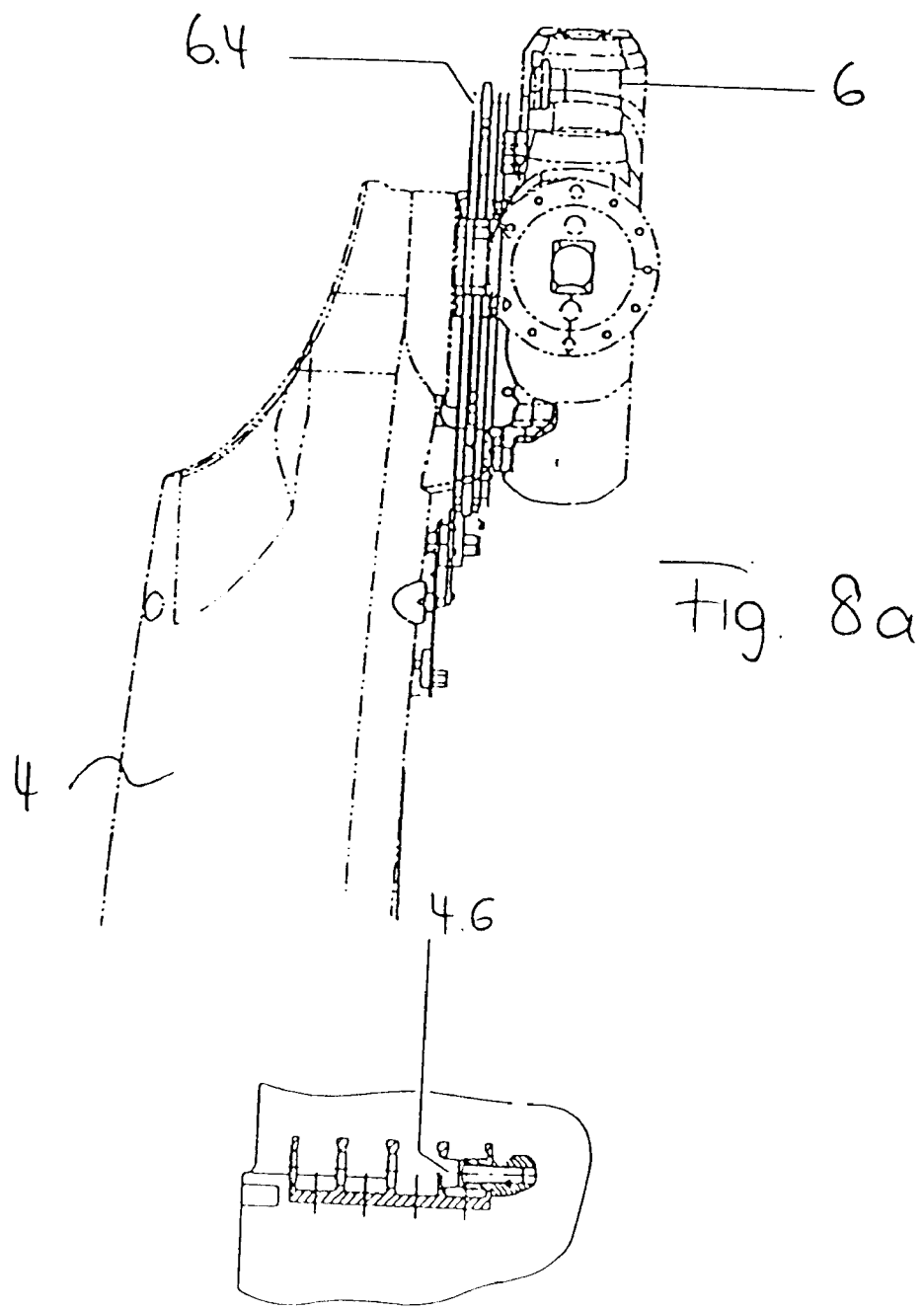
FIGS. 8a, b A view corresponding to arrow VIII in FIG. 7 of the upper area of the rocker arm and arm of a robot.

FIG. 4 shows devices 4.3 and 6.3 for the area monitoring of the movement of the rocker arm or robot arm 6 about the A2 or A3 axis. Here again there are grooved strips 4.4 or 6.4 around the particular axis. As can in particular be gathered from FIG. 8b, said strips are not fixed radially, but instead by axially parallel screws 4.6 (or corresponding screws for the grooved strip 6.3) on the particular bearing ring about the A2 or A3 axis. In the manner described in connection with the device for area monitoring for the movement about the A1 axis, the grooved strips 4.4, 6.4 carry cams 4.6 or 6.6 and initiators 4.8, 6.8 associated therewith and which are fixed to the rocker arm 4 by means of holder 4.2. The strips 4.4 and cams 4.6 are firmly placed on the bearing ring 4.5 for mounting the rocker arm 4 on carousel 3 and the grooved strips 6.4 with cams 6.6 are arranged in non-rotary manner on the robot arm 6, so that cams 4.6 and 6.6 are pivotable.

Figure 9:
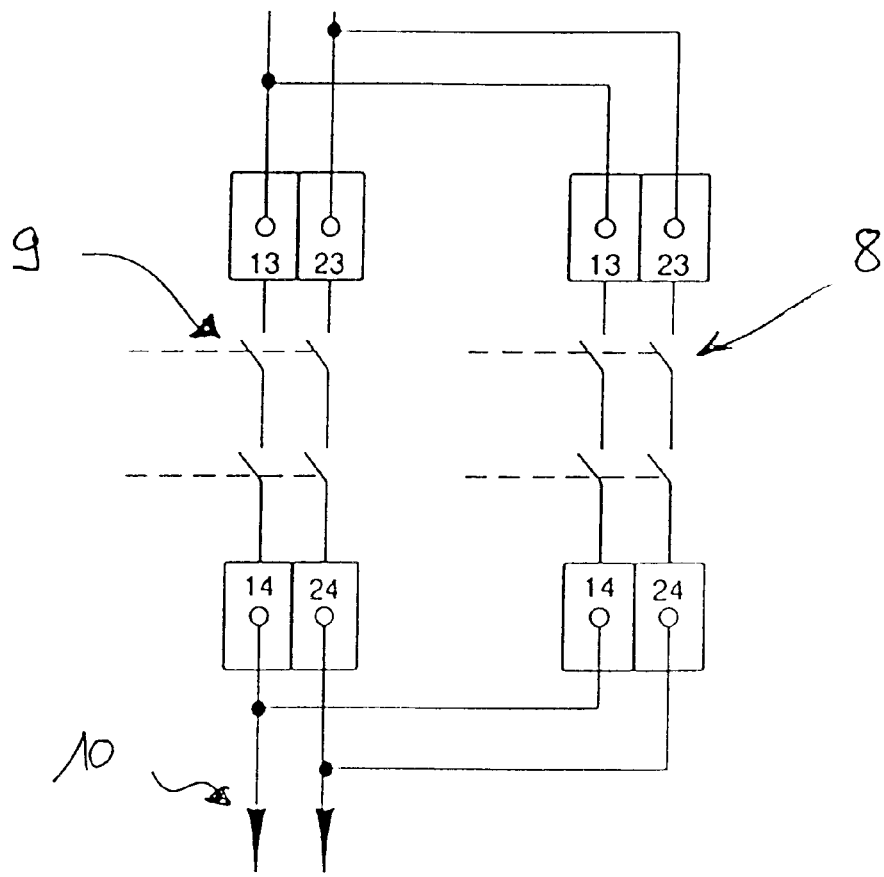
FIG. 9 A diagrammatic representation in connection with the combination of area monitoring of the robot movement and access monitoring.

FIG. 9 shows an example of a release circle for a monitoring area. Release contacts 8 for access to the robot work compartment, such as e.g. release contacts of a door are switched in parallel to the release contacts 9 of the robot area monitoring security relay associated with this area. The lines 10 lead to the power switching elements for the power supply of the drives.

If a robot, i.e. its robot arm 6 with the robot hand 7 is located in the area or vicinity of a protective device, such as a protective door, a pencil of light, etc., then the movement release of the robot for said protective door area must only take place when said door is closed. If the protective door is opened this leads to the immediate stoppage of the robot. If the robot with its arm 6 is not in the protective door area, the proximity initiators on the cams are set in such a way that the proximity initiator with the function of a closer undergoes damping and the proximity initiator with the function of an opener is not damped. The security relay gives a two-channel release. In the case of such a robot position the protective door can be opened without the robot being rendered stationary. Only when the switching state of a proximity initiator changes with the protective door opened e.g. by the robot moving into the area of the latter, does the security relay drop out and the robot is immediately stopped.

LIST OF REFERENCE NUMERALS

1 Robot
2 Base
2a Evaluating device
2.1 Holder
2.2,
2.21–2.26 Initiators
3 Carousel
3.1 Motor
3.2 Support structure
3.3 Carousel plate
3.4 Grooved strip
3.7 Bearing ring
3.8 Cam
3.11 Part annular segments
3.12/3.13 Screws
3.14 Cam end pieces
3.15 Lower part
3.16 Upper part
3.17 Screws
3.19 Threaded pin
4 Rocker arm
4.2 Holder
4.3 Control line
4.4 Grooved strip
4.6 Cam
4.8 Initiators
6 Robot arm
6.1/6.2 Motor
6.4 Grooved strip
6.6 Cam
6.8 Initiators
7 Robot hand
8/9 Release contact
10 Lines
G Danger area
U Monitoring area
B Angular range
F Release area
A1 axis
A2 axis
A3 axis

What is claimed is:

1. Robot having a device for area monitoring, in which at least one area of a rotary movement about at least one robot axis is monitored using arc shaped annular cams arranged coaxially to the axis to be monitored, switches are connected to an evaluating device and are detectable of said cams, wherein said switches are electronic proximity switches.

2. Robot according to claim 1, wherein grooved strips are arranged coaxially to the axis around which a movement is monitored and which are connected to cams and that an electronic proximity switch is associated with each cam.

3. Robot according to claim 1, wherein two electronic proximity switches are associated with each cam.

4. Robot according to claim 1, wherein the electronic proximity switches are held in a holder and laterally thereof are positioned grooved strips carrying the cams.

5. Robot according to claim 1, wherein an electronic proximity switch operating as an opener and an electronic proximity switch operating as a closer is associated by an area to be monitored.

6. Robot according to claim 1, wherein a danger area of an area to be monitored is protected by an electronic proximity switch acting as an opener.

7. Robot according to claim 1, wherein a release area of an area to be monitored is protected by an electronic proximity switch operating as a closer.

8. Robot according to claim 1, wherein an electronic proximity switch operating as an opener is associated with a cam corresponding to the danger area and an electronic proximity switch operating as a closer is associated with a cam corresponding to the release area for the same area to be monitored.

9. Robot according to claim 1, wherein the cams are held by two-part cam end pieces, whose lower part is positively held in the radial direction in the grooved strip and whose upper part is connected to the lower part.

10. Robot according to claim 9, wherein for non-positive fixing the lower part and upper part are braced against one another on the grooved strip and are braced against the latter.

11. Robot according to claim 9, wherein a cam is fixed between two cam end pieces.

12. Robot according to claim 9, wherein a cam is connected by threaded pins to the cam end pieces.

13. Robot according to claim 9, wherein the electronic proximity switches are adjustable and fixable relative to the cams associated therewith both radially and in elevation parallel to the axis to which the cams are coaxially arranged.

14. Robot according to claim 1, characterized by an at least two-channel monitoring for each area to be monitored.

15. Robot according to claim 1, characterized by a combination of an area monitoring of the movement of the robot with an access monitoring with respect to the robot.

16. A robot with a monitor area, the robot comprising:
a plurality of links pivotally connected together with a plurality of joints, one of said plurality of joints being a monitored joint, said monitored joint having a first part and a second part rotatably connected to said first part about a monitor axis;
a robot hand pivotally connected to one of said joints of said plurality of joints;
a robot base pivotally connected to a another one of said joints of said plurality of joints;
an arc shaped cam connected to said first part of said monitored joint and arranged coaxially with said monitor axis, said arc shaped cam having an arc length substantially equal to an arc length of the monitor area;

a proximity switch mounted on said second part of said monitored joint and generating an electrical detection signal when said first part rotates to position said cam in proximity of said proximity switch;

an evaluating device connected to said proximity switch and controlling operation of the robot based on a present state of said electrical detection signal.

17. A robot in accordance with claim 16, further comprising:

another monitor area complementary to said monitor area;

another arc shaped cam connected to said first part of said monitored joint and arranged coaxially with said monitor axis, said another arc shaped cam having an arc length substantially equal to an arc length of the another monitor area;

another proximity switch mounted on said second part and generating another electrical detection signal when said first part rotates to position said another cam in proximity of said another proximity switch;

said evaluating device also controlling operation of the robot based on a present state of said another electrical detection signal.

18. A robot in accordance with claim 16, wherein:

said monitor area is a danger area where one of said plurality of links or said robot hand is prohibited;

an area complementary to said monitor area is an operational area for said monitored joint;

said evaluating device operates the robot in said operational area and blocks operation of the robot in said danger area.

19. A robot in accordance with claim 17, wherein:

said monitor area is a danger area where one of said plurality of links or said robot hand is prohibited;

said another monitor area is an operational area for said monitored joint;

said evaluating device operates the robot in said operational area and blocks operation of the robot in said danger area.

20. A robot in accordance with claim 19, wherein:

said cams are selectively adjustably positioned around said monitor axis.

* * * * *